United States Patent [19]
Dallard

[11] 3,766,557
[45] Oct. 16, 1973

[54] ELECTRO-OPTICAL DIFFERENTIAL

[75] Inventor: Albert S. Dallard, San Pateo, Calif.

[73] Assignee: Raytheon Company, Lexington, Mass.

[22] Filed: May 13, 1971

[21] Appl. No.: 143,178

Related U.S. Application Data
[63] Continuation of Ser. No. 867,292, Oct. 17, 1969, abandoned.

[52] U.S. Cl. ............................. 343/55 T, 250/233
[51] Int. Cl. .......................... G01s 9/02, G01d 5/36
[58] Field of Search ........................ 343/5 R, 5 ST; 250/232, 233

[56] References Cited
UNITED STATES PATENTS 3,085,241  4/1963  Moore................................. 343/5 ST
3,435,213  3/1969  Colbow et al................... 250/233 X
3,526,448  9/1970  Senseney......................... 250/233 X Primary Examiner—T. H. Tubbesing
Attorney—Philip J. McFarland and Joseph D. Pannone

[57] ABSTRACT

An electro-optical differential device for combining the angular rotation of a ship's gyrocompass with the angular rotation of a radar antenna to compensate a radar PPI display for turning movements of a ship. Two polarizing disks are placed within a beam of light, one disk connecting with the gyrocompass and the other connecting with the antenna, and are rotated relative to each other to modulate the light. Electrical signals produced upon detection of the light beam energize a synchronous motor which rotates the PPI display in synchronism with the light modulation.

12 Claims, 3 Drawing Figures

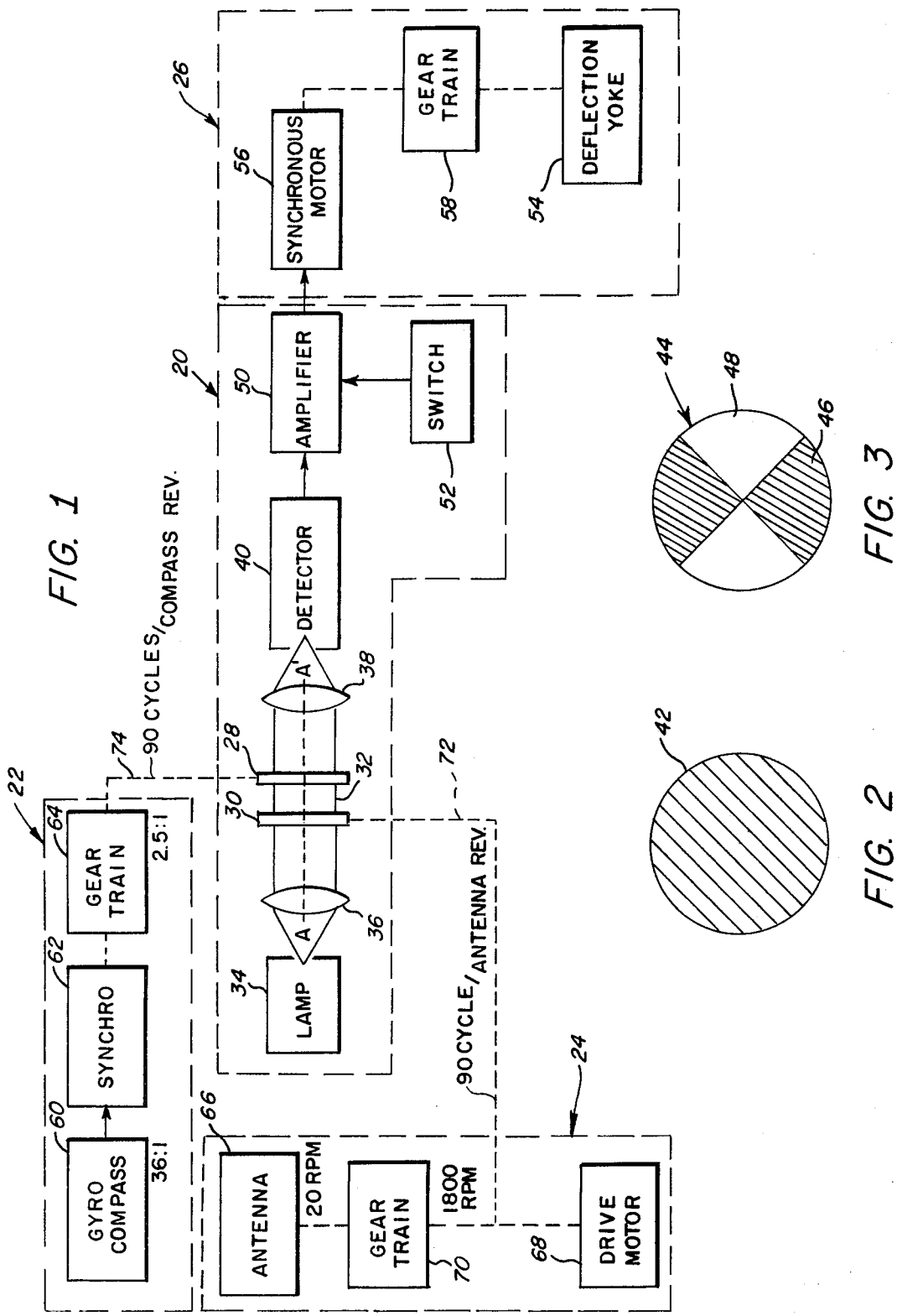

ELECTRO-OPTICAL DIFFERENTIAL

This application is a continuation of Ser. No. 867,292, filed Oct. 17, 1969, now abandoned.

BACKGROUND OF THE INVENTION

A display such as a Plan Position Indicator (PPI) is often utilized on board a vehicle such as an aircraft or ship, to show the relative bearings of objects which are scanned by a rotating radar antenna carried by the vehicle. Such display must be generated in synchronism with the rotation of the antenna relative to the ship if all the objects are presented in their correct relative bearings. For example, in a well known form of PPI used on board a ship, the display is generated with the aid of a magnetic deflection yoke rotatably mounted about the axis of the cathode ray tube (CRT) of the display, the rotation of the deflection yoke being synchronized with the rotation of the antenna.

It is frequently desirable to have a north stabilized display such that the bearings of the objects displayed on the PPI remain constant relative to the ship as it turns about its yaw axis. To implement such a display, a well-known angular correction obtained from a gyrocompass is combined, by either addition or subtraction, with the antenna azimuth angle (relative to the ship's heading) to offset the effect of a turning movement of the ship. Such angular correction is combined with the antenna azimuth angle in a manner analogous to the operation of mechanical differential gear train.

The implementation of the angular correction has usually, in the past, been accomplished by means of a servo system employing a synchro for electrically transmitting angle data from a ship's gyrocompass, and a differential or synchro, located at a distance from the gyrocompass, for receiving the angle data and converting it from an electrical signal to a mechanical representation such as a shaft rotation. This angular correction is then combined with angle data from the antenna and applied to rotation of the PPI deflection yoke by means of a second servo system. It is desirable to decrease the complexity of this prior art system, to reduce its cost especially in commercial applications, and to increase its accuracy and speed of response. The accuracy and speed of response have, in the past, been limited by the servo response due to the low torque of the synchro. By implementing a system in which the synchro has a minimal external load, the speed and accuracy can be improved to provide the desired angular correction even in an extreme case such as a small ship yawing in response to a sudden wave.

Accordingly, it is an object of the invention to provide an angle correction differential system of reduced complexity and cost It is furthermore an object to provide an angle correction differential system of increased accuracy and speed of response.

SUMMARY OF THE INVENTION

In accordance with the invention a beam of light is modulated by a pair of shuttering devices, preferably a pair of polarizer disks, which rotate with respect to each other, each disk having a light transmissivity characteristic that varies periodically with rotation about the axis of the disk, whereby the beam of light is modulated at a rate proportional to the difference of the angular rotation rates of the disks. One disk is connected to a first source of rotation (as the gyrocompass) and the second disk is connected to a second source of rotation (as the antenna). A detector, such as a photocell or phototransistor, intercepts the light passing through the disks to generate a control signal for driving a rotatable output device in synchronism with the modulation of the beam of light.

BRIEF DESCRIPTION OF THE DRAWINGS

The aforementioned objects and other features of the invention are explained in the following description taken in connection with the accompanying drawings wherein:

FIG. 1 is a block diagram of the invention with mechanical connections indicated by dashed lines; and FIG. 2 and FIG. 3 are plan views of alternative forms of optical modulation disks disclosed in FIG. 1.

DESCRIPTION OF THE PREFERRED EMBODIMENT

Referring now to FIG. 1, it may be seen that a modulator 20 (described in detail hereinafter) is driven by a source 22, providing a ship's heading data, and a source 24, providing antenna orientation data, and produces a control signal for a load 26. The modulator 20 comprises a pair of shuttering devices such as the two disks 28 and 30 placed transversely across a beam of light 32 for varying the intensity of the beam of light 32. The beam of light 32 is conveniently provided by a lamp 34 which transmits light through a lens 36, positioned before disk 30, and a second lens 38, positioned behind disk 28, which focus the beam of radiation 32 upon detector 40. Each of the disks 28 and 30 is constructed with a radiation transmissivity characteristic that varies with rotation about the axis of the disk. Each disk 28 and 30 is preferably a polarizer such as disk 42 shown in FIG. 2 or, alternatively, a shutter such as disk 44 shown in FIG. 3 having a pair of opaque segments 46 separated by a pair of transparent segments 48. In this embodiment, the two disks 28 and 30 are conveniently mounted rotatably about their common axis AA' which is approximately parallel to the axis of the beam of light 32. Disk 28 is rotated by source 22 at a rate related to the change in ship's heading, and disk 30 is rotated by source 24 at a rate related to the angular velocity of the antenna relative to the ship. Disks 28 and 30 are of relatively low inertia compared to sources 22 and 24 and therefore present no more than a negligible loading effect on these sources for increased accuracy and speed of response. As the two disks 28 and 30 rotate relative to each other, the intensity of the light reaching detector 40 is modulated at a rate or frequency proportional to the difference in the angular rotation rates of the two disks. A periodic modulation is obtained when disk 30 rotates (the rotation corresponding to the ship's antenna rotation) at a constant rate and disk 28 rotates (the rotation corresponding to the ship's yawing or turning) at a constant rate or at zero angular velocity.

A well-known sinusoidal modulation is obtained when polarizing disks such as disk 42 are utilized. Thus, when disk 28 and disk 30 are oriented with parallel polarization, the light intensity reaching detector 40 has a maximum intensity, and as the two disks 28 and 30 rotate relative to each other to a cross polarized position, the intensity of the light reaching detector 40 drops toward zero. At intermediary position of rotation relative to each other the two disks 28 and 30 produce an intensity modulation which varies as the square of the cosine of the angle between the polarization directions of the two disks 28 and 30. A similar result is obtained when disks such as the disk 44 of FIG. 3 are utilized, in which case a triangular form of modulation results. Thus, as is readily seen, when the opaque segments 46 of disk 28 are aligned with the transparent segments 48 of disk 30, a minimum intensity of light reaches detector 40. The intensity of the light reaching detector 40 increases from the minimal value at a rate linearly related to the angular orientation of the pattern of disk 28 relative to the pattern of disk 30 such that when the opaque segment 46 of disk 28 is aligned with the opaque segment 46 of disk 30, and similarly the transparent segments 48 of disk 28 are aligned with the transparent segments 48 of disk 30, a maximum intensity of light reaches detector 40. Accordingly, whether a polarizer disk such as disk 42 is utilized or whether some other form of disk with a periodic format such as that of disk 44 of FIG. 3 is utilized, the resulting modulation of the light impinging upon detector 40 is (if disk 28 is stationary) periodic. When either disk 42 or disk 44 is utilized, the modulation frequency is clearly related to the difference between the rotation rates of disk 28 and disk 30, and the phase angle of the modulation is related to the difference between the phase angles of disk 28 and disk 30, or accordingly, the difference between the phase angles of source 22 and source 24.

The detector 40 (preferably a photocell or phototransistor) is responsive to the intensity of the beam of light 32 and provides an electrical signal having a modulation corresponding to the modulation of the light. For example, when the polarizer disks 42 are utilized, in which case the light intensity varies as the square of the cosine of the angle between the polarization directions of the two disks, the detector signal comprises a well-known DC (or steady state) term and a double frequency sinusoid, that is, the frequency of the sinusoidal component of the detector signal is double the rotation rate of disk 30 relative to disk 28. This can be readily visualized since the intensity of the light impinging on detector 40 attains two maxima and two minima during each rotation of disk 30 relative to disk 28. Since there is essentially no time drift of the detector signal relative to the light modulation, the detector signal is synchronized with the light modulation, that is, the phase angle of the sinusoidal component of the detector signal is constant or locked relative to a reference point on the waveform of the modulated light. And similarly, as will become apparent from an example of the operation described hereinafter, the waveform of the modulated light is phase locked to the rotations of disks 28 and 30 and sources 22 and 24.

An amplifier 50 connects with the output of the detector 40 for amplifying the detector signal to a sufficient value to drive the load 26 connecting with the output of amplifier 50. A switch 52 is conveniently provided to disconnect amplifier 50 from detector 40 in order to enable alignment, to be described below, of the phase angle of the load 26 with the phase angles of source 22 and source 24. Amplifier 50 is AC coupled, for example, capacitor coupled, in order to pass only the alternating components of the modulated light, and to reject the DC or steady component of the modulated light. Accordingly, the output signal of amplifier 50 is an AC signal (a sinusoid when the polarizing disks 42 are utilized) which is phase locked to the difference between the phase angle of source 22 and the phase angle of source 24.

The load 26 is typically phase locked to the output signal of the amplifier 50 and may include a mechanical or electrical device such as a counter (not shown) responsive to the AC signal of the amplifier 50 for indicating the difference in rotations of the sources 22 and 24.

The invention is readily utilized for positioning a PPI display on board a ship in which case the load 26 includes the deflection yoke 54 of the PPI display, the deflection yoke 54 being driven by a synchronous motor 56 through gear train 58. In practice gear train 58 comprises typically a pinion (not shown) connecting directly with the synchronous motor 56 and meshing with the teeth of an annular gear (not shown) concentric with the deflection yoke 56. As is well known, the rotation of the synchronous motor 56 is locked to the phase of its input signal, herein the AC signal of amplifier 50, and accordingly, the rotation imparted to the deflection yoke 54 is phase locked to the rotations of source 22 and source 24. It will be shown, hereinafter, that is this embodiment the electrical signal energizing the synchronous motor 56 has a nominal frequency of 60Hz and, accordingly, a synchronous motor operating over a frequency range of typically 25–90Hz is utilized to provide operation over a range of antenna rotation rates.

In shipboard operation, source 22 comprises a gyrocompass 60 for providing a stable indication of north, a synchro 62 having stator windings connecting, in a well-known way, to the gyrocompass 60, and a gear train 64 interconnecting the rotor shaft (not shown) of synchro 62 with the disk 28. Gyrocompass 60, by way of example, has a conventional ratio, 36:1 step up, whereby angle data transmitted electrically from the gyrocompass 60 to the synchro 62 is multiplied by a factor of 36. Thus, during one full turn (360°) by the ship, the magnetic field of the stator windings of synchro 62, as well as the rotor shaft, rotates 36 full turns.

In shipboard operation, source 24 includes radar equipment comprising an antenna 66 driven by a motor 68 through gear train 70. In this example the shaft of motor 68 rotates at 1,800 revolutions per minute (RPM), the antenna 66 rotates at 20 RPM and the gear train 70 has a step down ratio of 90:1. Motor 68 and synchro 62 are positioned proximately to modulator 20 to facilitate a direct mechanical connection indicated by dashed line 72, between motor 68 and disk 30, and a similar direct mechanical connection, indicated by dashed line 74, between gear train 64 and disk 28.

As shown on the diagram of FIG. 1, motor 68 of source 24 and disk 30 rotate at 1,800 RPM, and rotate through 90 cycles of revolution for each revolution of antenna 66. The same scale factor is utilized for both source 22 and source 24, and accordingly, gear train 64 has a step up ratio of 2.5:1 to rotate disk 28 through 90 cycles of revolution for each revolution of the ship about its yaw axis.

Gear train 58 has a ratio such that deflection yoke 54 rotates at the same rate as does antenna 66 when the ship's heading is constant, the ratio being calculated as follows: When the ship's heading is constant, disk 28 is stationary. Disk 30 rotates at 1,800 RPM (relative to the ship) irrespectively of turning movements by the ship. The intensity of the light incident upon detector 40 is modulated at a rate equal to double the rotation rate of disk 30 when disk 28 is stationary, and accordingly, the AC signal of amplifier 50 has a frequency of twice the rotation rate of disk 30 relative to disk 28, which in this example is 2 × 1,800 = 3,600 RPM or 60Hz.

The rotor of synchronous motor 56 makes one rotation for each period of the AC signal of amplifier 50. Gear train 58 is therefore given a reduction ratio of 180:1 so that the deflection yoke 54 rotates at 20 RPM, the rate of rotation of the antenna 66, when the ship's heading is constant.

The operation during a change in ship's heading is demonstrated as follows: Assume, for example, that the ship makes one full turn (360°) during a period of time when the antenna 66 rotates relative to the ship a total of N revolutions. The total number of antenna revolutions relative to a fixed reference is then N ± 1, the plus sign indicating a rotation of the ship in the same direction as the rotation of the antenna and the minus sign indicating a rotation of the ship in the opposite direction from the rotation of the antenna. The total numer of revolutions of disks 28 and 30 relative to each other is, accordingly, 90(N ± 1). The total number of periods of the light modulation detected by detector 40, the AC signal of amplifer 50, and the rotation of synchronous motor 56 is equal to 90(N ± 1)2. Gear train 58 reduces this number by a factor of 180 giving N ± 1 rotations of the deflection yoke 54, which is equal to the number of rotations of the antenna relative to a fixed reference.

To initially align the deflection yoke 54 in correspondence with the orientation of the antenna 66, switch 52 is operated to momentarily disconnect amplifier 50 so that the AC signal of amplifier 50 is momentarily interrupted from energizing the synchronous motor 56. The synchronous motor 56 then begins to slow down until such time as switch 52 is operated to reconnect amplifier 50. Successive operations of switch 52 allow the antenna 66 to rotate relative to the deflection yoke 54 to bring the orientation of the antenna 66 into correspondence with the orientation of the deflection yoke 54.

It is understood that the above-described embodiments of the invention are illustrative only, and that modifications thereof will occur to those skilled in the art. For example, a beam of radiation other than light, such as microwave radiation, can be utilized with suitable shuttering devices. Accordingly, it is desired that the invention is not to be limited to the embodiments disclosed herein but is to be limited only as defined by the appended claims.

I claim:

1. In a vehicle having means for rotating the vehicle through a heading angle relative to north, a gyrocompass indicating the heading angle relative to north, an antenna, a drive mechanism for rotating the antenna through a bearing angle relative to the vehicle, and a display having a rotatable indicator of direction, the improvement being a stabilization means for positioning the rotatable indicator of direction relative to the antenna and the vehicle to form a north stabilized display, the stabilization means comprising:

a radiant source providing a beam of radiation;
modulation means responsive to the heading angle of the vehicle and responsive to the bearing angle of the antenna for modulating the intensity of the beam of radiation with a modulation frequency proportional to the rate of rotation of the vehicle through the heading angle and the rate of rotation of the antenna through the bearing angle, and providing a signal having a frequency equal to the modulation frequency; and
synchronized drive means responsive to the frequency of the signal of the modulation means and connecting with the rotatable indicator whereby the rotatable indicator is positioned.

2. The stabilization means of claim 1 wherein the synchronized drive means comprises:

a synchronous motor energized by the signal of the modulation means and rotating at a frequency proportional to the frequency of the signal of the modulation means; and
means connecting the synchronous motor to the rotatable indicator whereby the rotatable indicator is positioned.

3. The stabilization means of claim 2 wherein the modulation means comprises:

a first and a second rotatable shuttering means positioned within and transversely to the beam of radiation, and characterized by a radiation transmissivity such that rotation of the second shuttering means relative to the first shuttering means modulates the intensity of the beam of radiation with a modulation frequency proportional to the rate of rotation of the second shuttering means relative to the firt shuttering means;
means for rotating the first shuttering means through an angle proportional to the heading angle of the vehicle;
means for rotating the second shuttering means through an angle proportional to the bearing angle of the antenna; and
means for detecting the modulated beam of radiation to provide a signal having a frequency equal to the modulation frequency.

4. The stabilization means of claim 3 wherein the first and the second shuttering means comprise opaque and transparent segments.

5. In a vehicle having an antenna, a drive mechanism for rotating the antenna through a bearing angle with respect to the vehicle, a gyrocompass indicating the heading angle of the vehicle relative to north, and a display having a rotatable indicator of direction, the improvement being a stabilization means for positioning the rotatable indicator of direction relative to the antenna and the vehicle to form a north stabilized display, the stabilization means comprising:

a lamp providing a beam of light;
a first and a second rotatable polarizer disk positioned within and transversely to the beam of light;
first means for rotating the first polarizer disk through an angle proportional to the heading angle of the vehicle;
second means for rotating the second polarizer disk through an angle proportional to the bearing angle to the antenna relative to the vehicle, whereby the rotation of the second polarizer disk relative to the first polarizer disk modulates the intensity of the beam of light with a modulation frequency proportional to the rate of rotation of the second polarizer disk relative to the first polarizer disk;
a detector positioned to receive the modulated beam of light, the detector producing a signal having a frequency equal to the modulation frequency;

a synchronous motor energized by the detector signal and rotating at a frequency proportional to the frequency of the detector signal; and means connecting the synchronous motor to the rotatable indicator whereby the rotatable indicator is positioned.

6. In combination:

a radiant source providing a beam of radiation;

a first and a second shuttering means disposed within said beam of radiation for producing a modulation of said beam of radiation at a rate proportional to a frequency of shuttering by said first shuttering means and to a frequency of shuttering by said second shuttering means; and output means responsive to said modulated radiation for providing an output signal at a rate proportional to said modulation rate, said output means comprising detection means responsive to said radiation for providing electrical signal pulses at a frequency equal to said modulation rate, said output means further comprising means for providing an angular increment in response to individual ones of said electrical signal pulses.

7. In combination:

a radiant source providing a beam of radiation;

a first and a second shuttering means disposed within said beam of radiation for producing a modulation of said beam of radiation at a rate proportional to a frequency of shuttering by said first shuttering means and to a frequency of shuttering by said second shuttering means; and output means responsive to said modulated radiation for providing an ouput signal at a rate proportional to said modulation rate, said output means comprising detection means responsive to said radiation for providing an electrical signal at a frequency equal to said modulation rate, said output means further comprising motor means responsive to the electrical signal of said detection means for providing said output signal, said output signal being a mechanical movement by said motor means.

8. The combination according to claim 7 wherein said mechanical movement is a shaft rotation synchronized to said modulation.

9. The combination according to claim 8 further comprising a first and a second drive means for driving respectively said first and said second shuttering means.

10. The combination according to claim 9 wherein said first drive means rotates said first shuttering means about an axis of said beam at a rate proportional to a rate of a first rotation, and said second drive means rotates said second shuttering means about said axis of said beam at a rate proportional to a rate of a second rotation.

11. The combination according to claim 10 further comprising a display driven by said rotating shaft to indicate a difference in rotation between said first and said second rotations.

12. The combination according to claim 11 wherein said first drive means is responsive to the rotation of a vehicle relative to a compass, and said second drive means is responsive to the rotation of an antenna relative to said vehicle.

* * * * *

UNITED STATES PATENT OFFICE
CERTIFICATE OF CORRECTION

Patent No. 3,766,557          Dated October 16, 1973

Inventor(s) Albert S. Ballard

It is certified that error appears in the above-identified patent and that said Letters Patent are hereby corrected as shown below:

On the title page, the inventor's name should read -- Albert S. Ballard -- not "Albert S. Dallard"

Signed and sealed this 16th day of April 1974.

(SEAL)
Attest:

EDWARD M. FLETCHER, JR.       C. MARSHALL DANN
Attesting Officer             Commissioner of Patents